United States Patent [19]

Claar et al.

[11] Patent Number: 4,512,388

[45] Date of Patent: * Apr. 23, 1985

[54] HIGH-TEMPERATURE DIRECT-CONTACT THERMAL ENERGY STORAGE USING PHASE-CHANGE MEDIA

[75] Inventors: Terry D. Claar, Lisle; Randy J. Petri, Chicago, both of Ill.

[73] Assignee: Institute of Gas Technology, Chicago, Ill.

[*] Notice: The portion of the term of this patent subsequent to Dec. 20, 2000 has been disclaimed.

[21] Appl. No.: 506,030

[22] Filed: Jun. 20, 1983

Related U.S. Application Data

[63] Continuation-in-part of Ser. No. 275,380, Jun. 19, 1981, Pat. No. 4,421,661.

[51] Int. Cl.³ .................. C09K 5/06; F24H 7/04; F28F 23/00; F28D 17/00
[52] U.S. Cl. .......................... 165/1; 165/10; 165/104.11; 252/70; 428/402; 428/403; 428/404
[58] Field of Search ............... 165/10, 104.11; 252/70

[56] References Cited

U.S. PATENT DOCUMENTS

| | | | |
|---|---|---|---|
| 3,669,889 | 6/1972 | Juzvuk | 252/71 |
| 3,972,821 | 8/1976 | Weidenbenner | 252/75 |
| 4,003,426 | 1/1977 | Best | 165/53 |
| 4,111,189 | 9/1978 | Dizon | 165/10 |
| 4,115,632 | 9/1978 | Kinoshita | 427/215 |
| 4,221,259 | 9/1980 | Ronc | 252/70 |
| 4,234,782 | 11/1980 | Barabas et al. | 165/10 |
| 4,241,782 | 12/1980 | Schoenfelder | 165/10 |
| 4,259,401 | 3/1981 | Chahroudi et al. | 165/10 |
| 4,268,558 | 5/1981 | Boardman | 126/400 |
| 4,283,925 | 8/1981 | Wildfeuer | 165/10 |

FOREIGN PATENT DOCUMENTS 1587725  4/1981  United Kingdom ............... 252/70

Primary Examiner—Albert W. Davis, Jr.
Attorney, Agent, or Firm—Thomas W. Speckman

[57] ABSTRACT

A high-temperature direct-contact thermal energy storage element for use in a system for storage and retrieval of thermal energy in the range of about 400° to about 3000° F. The thermal energy is directly stored, without heat exchange tubes in composite latent/sensible heat thermal energy storage media utilizing the heat of fusion and high-temperature stability of alkaline metal and alkaline earth carbonates, chlorides, nitrates, nitrites, fluorides, hydroxides and sulfates and metal, metallic alloys and mixtures thereof maintained within a porous support-structure material which itself is capable of storage as sensible heat. The thermal energy storage according to the invention may be effectively utilized for storage of thermal energy derived from solar, industrial waste, process heat, and high-temperature gas reactor energy sources and retrieved for a wide variety of uses such as combustion air preheating, drying, space heating, heating of process gases, power generating heat engines and the like.

25 Claims, 1 Drawing Figure

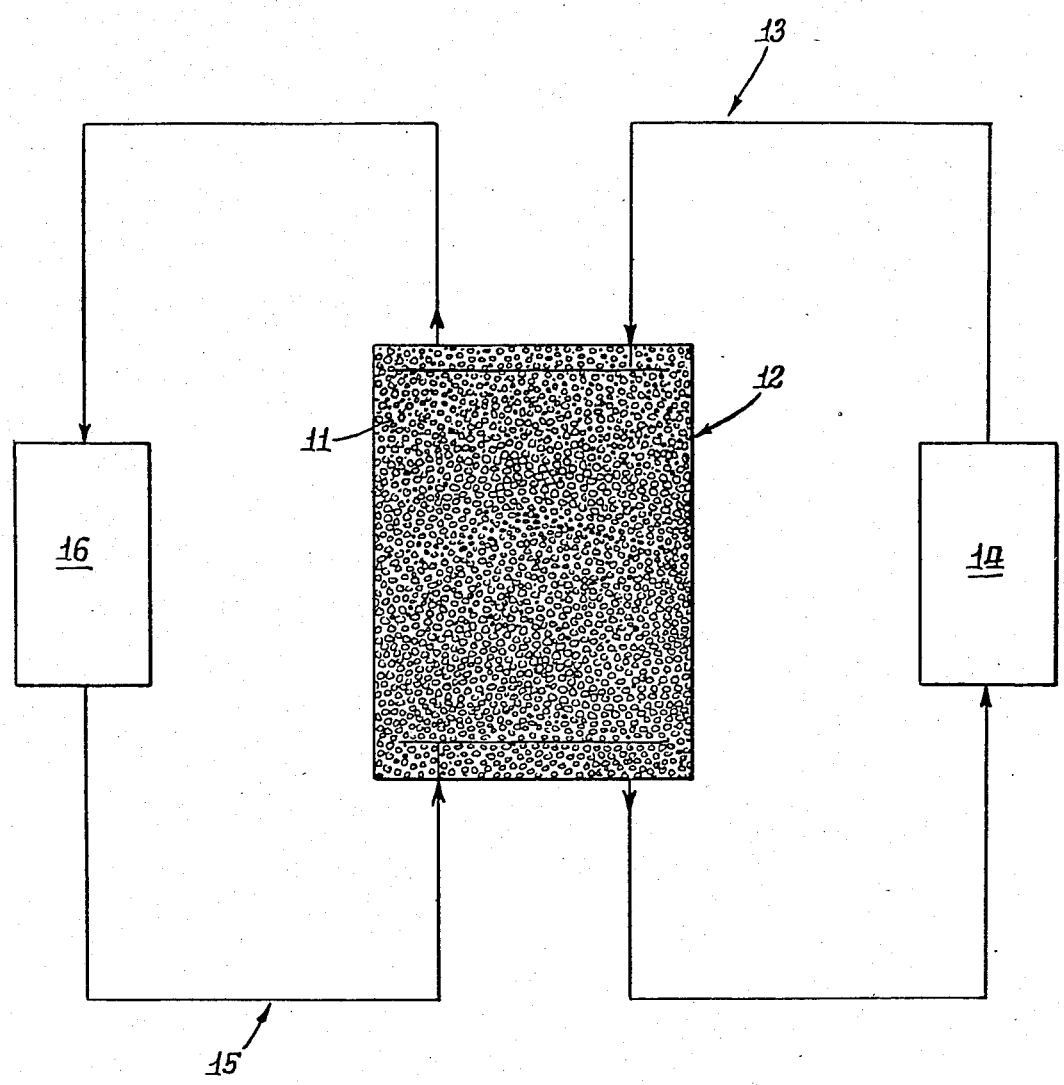

HIGH-TEMPERATURE DIRECT-CONTACT THERMAL ENERGY STORAGE USING PHASE-CHANGE MEDIA

CROSS REFERENCE TO RELATED APPLICATION

This application is a continuation-in-part application of our earlier filed U.S. patent application Ser. No. 275,380, filed Jun. 19, 1981, now U.S. Pat. No. 4,421,661 granted Dec. 20, 1983.

BACKGROUND OF THE INVENTION

1. Field of the Invention

This invention relates to high-temperature direct-contact thermal energy storage. The thermal energy stored according to this invention is in the temperature range of over about 400° F. up to about 3000° F. and is directly stored, without necessity of heat exchange tubes to provide containment and heat transfer surface, in composite latent/sensible heat thermal energy storage media utilizing the heat of fusion and high temperature stability of alkali metal and alkaline earth carbonates, chlorides, nitrates, nitrites, fluorides, hydroxides, sulfates and mixtures thereof and metals and alloys maintained within a porous storage-support material which itself is capable of storage of sensible heat. Various mixtures of alkali metal and alkaline earth salts and various metals and alloys may be used to obtain desired thermal and physical properties for storage of thermal energy derived from solar energy sources, industrial waste and process heat, high temperature gas reactors and the like.

2. Description of the Prior Art

There have been many prior attempts to store thermal energy utilizing the heat of fusion in aqueous-hydrate systems. For example, U.S. Pat. No. 3,986,969 teaches the use of a heat of fusion material plus attapulgite clay as a homogenizing agent; U.S. Pat. No. 1,894,775 teaches various latent heat of fusion storage chemicals; U.S. Pat. No. 4,146,057 teaches thermal storage as latent heat of fushion by passing a closed potassium loop and a closed steam/water loop through aluminum which serves to store the latent heat of fusion and is exemplary of prior practices utilizing tube heat exchangers to provide containment and heat transfer surface between storage media and working fluid; U.S. Pat. No. 4,223,721 teaches thermal storage by a eutectic salt packed with a thermal insulating material such as glass fiber insulation; and Japanese Pat. No. 51-96788 teaches thermal storage at about room temperature by hydrate reaction of $Na_2SO_4$ and/or $Na_2CO_3$ with a light aggregate such as gypsum for support and prevention of deliquescence or efflorescence. U.S. Pat. No. 4,237,023 teaches an aqueous heat storage composition which absorbs and stores heat as it is heated above its phase-change temperature and releases stored heat as it is cooled below its phase-change temperature, including use of fumed silicon dioxide which acts as a stabilizing agent and provides prolonged heat storage efficiency. U.S. Pat. No. 3,720,198 teaches thermal storage by heat of fusion with seed crystals in the thermal storage material to prevent change of distribution during the melting phase. The prior art hydrate systems have experienced problems with supercooling and phase separation which the last two patents referred to seek to overcome.

Latent heat based thermal energy storage systems have employed mechanical scrapers to remove solidified salts from finned tube heat exchangers during discharge cycles to improve thermal efficiencies of such systems. However, the mechanical systems have a limited lifetime, require frequent maintenance, and may only be used on the discharge cycle due to scraper freeze-up. Further, tube-intensive latent heat thermal energy systems require high cost super alloy materials for adequate strength and corrosion resistance above about 1300° F.

SUMMARY OF THE INVENTION

This invention provides a high-temperature direct-contact thermal energy storage element comprising a phase-change salt, metal or alloy retained within a porous, sensible heat storage phase. Thermal energy is directly stored according to the invention at about 400° to about 3000° F. without the use of conventional heat exchange means. The thermal performance is enhanced by the direct contacting of working fluid and the thermal energy storage element of this invention. Suitable working fluids for direct contact are gases, such as carbon dioxide, oxygen air, hydrogen, inert gases such as argon, helium, nitrogen, and combustion gases and liquids, such as oils, molten salts, metals and alloys.

The high-temperature direct-contact thermal energy storage element of this invention is a composite of phase-change chemical comprising about 10 to about 90 volume percent and a thermal energy storage-support material which comprises about 10 to 90 volume percent. This composite latent/sensible heat thermal energy storage element utilizes the heat of fusion and high temperature stability of alkali metal and alkaline earth carbonates, chlorides, nitrates, nitrites, fluorides, hydroxides, sulfates, metals, alloys and mixtures thereof having a solid-liquid phase-change temperature at about 400° to about 3000° F. The phase-change chemical is retained by capillary action within the pores of a thermal energy storage-support material which itself is capable of sensible heat storage. Suitable thermal energy storage-support materials are metal oxides, aluminates, titanates, zirconates, metal carbides, nitrides, borides and silicides having sub-micron particles which do not substantially coarsen with thermal cycling at temperatures up to the phase change temperature used and having a surface area greater than about 1 square meter per gram. Exemplary of suitable thermal energy storage-support materials are materials based on metallic carbides, nitrides, borides, silicides and oxides such as lithium aluminate, sodium aluminate, magnesium oxide, alumina, lithium ferrite, lithium titanate, barium titanate, strontium titanate, and mixtures thereof. The thermal and physical properties of the thermal energy storage element are controlled by varying the phase-change chemical and the relative proportions of phase-change chemical and thermal energy storage-support material. It is particularly suitable to use alkali metal and alkaline earth carbonates, chlorides, nitrates, nitrites, fluorides, hydroxides, sulfates and mixtures thereof for phase-change temperatures of about 400° to about 2000° F. and to use metals and metal alloys for phase-change temperatures of about 400° to about 3000° F., preferable temperatures for use of metals and metal alloys being about 1500° to about 3000°. Metal phase-change chemicals may also be advantageous at the lower temperature range due to their greatly higher thermal conductivities.

Powders of composite material comprising phase-change chemical and thermal energy storage-support particles are prepared by dry blending or spray drying. Resulting powders are formed into suitable shapes by cold pressing, extrusion, briquetting or other suitable methods, and heated above the phase-change chemical melting point to densify and obtain the desired shape.

It is an object of this invention to provide a high-temperature thermal energy storage element comprising latent/sensible heat media and process that overcomes many of the disadvantages of the prior art thermal energy storage elements and processes.

It is another object of this invention to provide a high-temperature thermal energy storage element that provides direct contact between storage media and working fluid.

Accordingly, it is an object of this invention to provide a high-temperature direct-contact thermal energy storage element comprising composite latent/sensible heat media and process that eliminates the need for conventional heat exchange equipment.

It is yet another object of this invention to provide a heat exchange process utilizing the high-temperature direct-contact thermal energy storage element of this invention.

These and other objects, advantages and features of this invention will become apparent from the following description and reference to the drawing.

BRIEF DESCRIPTION OF THE DRAWING

The FIGURE shows a simplified schematic flowsheet for a thermal energy storage and retrieval process utilizing the high-temperature direct-contact thermal energy storage elements of this invention.

DESCRIPTION OF THE PREFERRED EMBODIMENTS

The composite latent/sensible heat thermal energy storage media of this invention take advantage of the latent heat of fusion and high temperature stability of alkali metal and alkaline earth carbonates, chlorides, nitrates, nitrites, fluorides, hydroxides, sulfates and metals and alloys and mixtures thereof. These phase-change chemicals have a maximum operating range of about 400° to about 3000° F. Phase-change chemicals of alkali metal and alkaline earth carbonates, such as sodium, potassium, lithium, magnesium, calcium, strontium and barium carbonates are suitable for phase-change temperatures of about 700° to about 1700° F. while metals and alloys are suitable for temperatures of about 1300° to about 3000° F., and may be advantageously used in the temperature range of 400° to 1300° F. due to their higher thermal conductivities. A desired operating range between the temperature limits can be produced by varying the relative amounts of the individual components in a phase-change material/sensible support material mixture. The use of mixtures of phase-change chemicals is not restricted to eutectic compositions to obtain desired thermal and physical properties. U.S. Pat. No. 3,720,198 teaches the use of metallic salt hydrates which melt in their own water of crystallization and double salt hydrates as thermal storage substances. The use of hydrates restricts the operating range of the thermal storage to low temperatures, below about 200° F. compared to the high temperature range of about 400° to 3000° F. for which the thermal storage of the present invention may be utilized. Phase-change chemicals of metals and metal alloys are preferred for temperatures of about 1300° to about 3000° F. Suitable metals for use in this temperature range include individual elements comprising Al, Cu, Si, Mg, Zn, Ti, Ce, La; and alloys comprising these elements, such as $Mg_2Si/Si$, Cu-Si, Cu-Mg-Si, P-Cu-Zn and Mg-Cu-Zn. Phase-change metals and metal alloys are also suitable for use at lower temperatures, such as, Al-Cu-Si, Al-Cu-Mg-Zn, Al-Mg-Zn. The selection of the phase-change material is made on the basis of melting point, heat-of-fusion, wetting of ceramic support matrix, surface tension, viscosity, vapor pressure, volume change on fusion, thermal expansion, and chemical compatability with support matrix and working fluid.

The phase-change chemicals utilized in this invention are supported within the pores of a material which also serves as sensible thermal energy storage. The sensible thermal storage-support material needs to be of submicron particle size and having a surface area greater than about 1 and most preferably greater than about 10 square meters per gram of storage-support material. Preferably, the finished storage-support material has a particle size about 0.01 to about 1.0 microns and most preferably about 0.05 to about 0.5 microns and has a pore surface area about 5 to about 100 and most preferably about 10 to about 50 square meters per gram of storage-support material. Furthermore, the sensible thermal storage-support material must not substantially coarsen with thermal cycling at temperatures used for the particular application. The storage-support material should be substantially insoluble in and chemically inert to the phase-change chemical over the high temperature range used in the present process. Sensible heat storage support materials may be based on carbides, nitrides, borides (oxides or aluminates), silicides and other refractory metals, such as SiC, $Si_3N_4$, TiC, TiN and $TiB_2$. Various metal oxides are suitable, such as lithium aluminate, sodium aluminate, magnesium oxide, alumina, lithium ferrite, lithium titanate, barium titanate, strontium titanate, and mixtures thereof. Particularly preferred are lithium aluminate, sodium aluminate, magnesium oxide, and mixtures thereof. The choice of the sensible heat storage-support matrix material depends greatly upon compatibility with the latent heat phase-change chemical and the temperature of operation of the direct contact thermal energy storage system.

The sensible heat storage-support structure may be reinforced against thermal cycle cracking by the addition of ceramic or metallic particulates or fibers or mixtures thereof. The effective thermal conductivity can be regulated by the addition of metallic particulates or fibers or mixtures thereof to the thermal energy storage-support material. The additive ceramic or metallic reinforcement, such as aluminum, stainless steel, Fe-Ni-Cr-Al alloys, copper-aluminum alloys may be present in an amount up to about 5 to about 20 volume percent, based upon volume of the sensible heat storage-support material. It is preferred to use fibers of stainless steel containing approximately 5 to 10 weight percent aluminum and of a size 5 to 100 microns making up about 5 to about 10 volume percent of the sensible heat storage-support material. The use of ground glass fibers for shape retention as taught by U.S. Pat. No. 3,720,198 is not suitable in the thermal energy storage element of the present invention since it will chemically react with many of the phase-change chemicals, such as the carbonates, at the operating temperatures.

The high temperature direct-contact thermal energy storage element of this invention comprises the aforementioned solid-liquid phase-change chemical supported within the pores of the aforementioned sensible thermal storage-support material by capillary action. The high temperature thermal energy storage element comprises about 10 to about 90 volume percent solid-liquid phase-change chemical and about 10 to about 90 volume percent storage-support material and preferably about 50 to about 80 volume percent solid-liquid phase-change chemical and about 20 to about 50 volume percent storage-support material. By proper selection of the solid-liquid phase-change chemical storage-support material ratio, storage-support material composition and particle size (surface area to weight ratio), and solid-liquid phase-change chemical composition, various shapes (pellets, briquettes, spheres) of differing heat capacities and phase-change temperatures may be fabricated. These thermal energy storage elements retain their shape and integrity during repeated melting-/solidification thermal cycles at temperatures suitable for storage of thermal energy from solar sources, industrial waste, process heat and high temperature reactor gas cooling streams. The thermal energy may be recovered and used for a wide variety of uses such as driving heat engines, combustion air preheating, drying, space heating, heating of process gases, and the like.

Powders of composite material containing phase-change chemical and sensible thermal storage-support particles may be prepared by dry blending, spray drying, or by powder metallizing techniques according to methods known to the art. Resulting powders are formed by cold pressing, briquetting or extrustion and heated above the phase-change chemical melting point to densify and obtain the desired shape. Alternately, sensible storage-support bodies of controlled porosity and pore size distribution obtained by sintering may be impregnated with the molten phase change chemical to produce the composite thermal energy storage element. Suitable shape and size for the thermal energy storage elements of this invention are discrete shapes such as pellets, briquettes, spheres or other shapes of about 0.5 to about 12 inches in their maximum overall dimension. The pellets should be so shaped and sized as to allow packing within a containment vessel while providing low pressure drop working fluid passage. Alternatively, the composite media may be formed into brick-shaped elements (e.g., rectangular shapes approximately $9'' \times 4\frac{1}{2}'' \times 3''$) or into hexagonal shapes with gas flow passages, which can be stacked in an ordered arrangement. The containment vessel may be of any suitable material and thermally insulated either internally or externally.

An important advantage of the high-temperature thermal energy storage element according to this invention is that it allows direct contact between storage media and suitable working fluids, for both thermal storage and retrieval, thereby increasing thermal performance. Suitable working fluids for direct contacting for thermal storage and retrieval are carbon dioxide, air, oxygen, hydrogen, inert gases such as helium or argon, nitrogen and combustion gases, and liquids, such as oils, molten salts, metals and alloys, and non-reactive mixtures thereof. By such direct contacting, the high-temperature thermal energy storage element of this invention eliminates the need for conventional heat exchange means. Dry inert gases or liquids can be used in contact with composite thermal energy storage and retrieval media comprising a broad range of phase-change materials encompassing the alkali and alkaline earth carbonates, chlorides, nitrates, nitrites, fluorides, hydroxides, sulfates, metals, metal alloys, and mixtures thereof. For gases containing oxygen, carbon dioxide or water vapor, the carbonate salts are generally preferred because of their greater high-temperature chemical stability in oxidizing environments. Composite thermal energy storage and retrieval media comprising carbonates are tolerant to water vapor in the gases, up to certain limits depending on temperature, carbonate composition, gas composition and gas pressure. The carbonate eutectic 62 mol % $Li_2CO_3$ - 38 mol % $K_2CO_3$ retained within lithium aluminate support can tolerate at least 5 to 10 percent $H_2O$ in $O_2$-$CO_2$ gas mixtures at 400° to 1600° F. and 1 atmosphere pressure. The working fluid may function as a storage working fluid for thermal energy passing from a thermal energy heat source to the thermal energy storage elements in a storage mode or as a retrieval working fluid for thermal energy transfer from the thermal energy storage elements in a retrieval mode. The storage working fluid and retrieval working fluid may be the same or may be different as long as there is no undesired chemical reaction between them.

A high-temperature direct contact thermal energy storage and retrieval system according to this invention may comprise a plurality of high-temperature direct-contact thermal storage elements as described above, such as those comprising about 10 to about 90 volume percent solid-liquid phase-change chemical having a phase-change temperature at about 400° to about 3000° F. and selected from the group consisting of alkali metal and alkaline earth carbonates, chlorides, nitrates, nitrites, fluorides, hydroxides, sulfates and metals, metal alloys and mixtures thereof supported within the pores of sensible thermal energy storage-support material selected from the group consisting of metal oxides, aluminates, titanates and zirconates, and metallic carbides, nitrides, borides and silicides having sub-micron particle size which do not substantially coarsen with thermal cycling at temperatures up to about 2000° F. and having a surface area greater than about 1 square meter per gram of storage-support material, said storage-support material comprising about 10 to about 90 volume percent of said thermal storage element; at least one containment vessel(s) for the thermal storage elements; a storage working fluid for thermal energy passing from a thermal energy heat source to the storage elements by direct contact with the phase-change chemical at a temperature higher than its phase-change temperature and means for passage of the storage working fluid from the heat source to contact with the phase-change chemical in a storage mode; and a retrieval working fluid for thermal energy retrieval from the storage elements by direct contact with said phase-change chemical at a temperature lower than its phase-change temperature and transfer to a desired use; and means for passage of the retrieval working fluid from contact with the phase-change chemical to the desired use in a retrieval mode. It is readily apparent that when one containment vessel is used the system must be cycled in the storage and retrieval modes. When two and more containment vessels are used, the system may be operated simultaneously in both the storage and retrieval modes and on a continuous basis by proper cycling of the storage and retrieval streams to the individual containment vessels. It will be readily apparent to one skilled in the art that a wide range of temperatures and thermal capacities may be accommodated by varying sizes and numbers of containment vessels to obtain desired thermal performance.

The process of thermal energy storage according to this invention comprises passing a storage working fluid stream in contact with a plurality of thermal energy storage elements as defined above for thermal storage, the inlet temperature of the storage working fluid being above the phase-change temperature of the phase-change chemical, and then passing a retrieval working fluid stream in contact with the thermal energy storage element for retrieval of thermal energy, the inlet temperature of the retrieval working fluid stream being below the phase-change temperature of the phase-change chemical, thereby increasing the temperature of the retrieval working fluid stream.

The figure illustrates in simplified schematic form one embodiment of a system for the storage and retrieval of thermal energy utilizing the high-temperature direct-thermal energy storage elements of this invention. Thermal energy storage elements 11 are housed in a suitable containment vessel 12. Storage working fluid is circulated by conventional means from a high-temperature thermal energy source 14 through storage working fluid conduit system 13 and brought into direct contact with the thermal energy storage elements at a temperature above the melting temperature of the phase-change chemical. Then a retrieval working fluid is circulated through retrieval working fluid conduit system 15 and brought into direct contact with the thermal storage elements by conventional means at a temperature lower than the phase-change temperature thereby heating the retrieval working fluid which delivers heat to a desired use indicated by use means 16. Suitable materials for construction, shape, size and number of containment vessels, piping, fluid transport means and associated equipment is readily apparent to one skilled in the art upon reading of this disclosure.

The following examples are set forth for specific exemplification of preferred embodiments of the invention and are not intended to limit the invention in any fashion.

EXAMPLE I

Composite powder comprising 63 volume percent phase change chemical having a melting point of 910° F. made up of 62 mol percent lithium carbonate ($Li_2CO_3$) and 38 mol percent potassium carbonate ($K_2CO_3$) and 37 volume percent lithium aluminate ($LiAlO_2$) ceramic storage-support material was prepared by spray drying an aqueous slurry of $\gamma$-$Al_2O_3$, LiOH $H_2O$ and KOH. The spray dried powders were reacted with $CO_2$ and heated at 1200° F. to convert the composite powder to a mixture of $LiAlO_2$ and $Li_2CO_3$-$K_2CO_3$ eutectic. The $LiAlO_2$ particles had surface areas of greater than about 15 $m^2/g$. The powders were cold-pressed into pellets measuring approximately 0.60 inch high $\times$ 0.81 inch in diameter (mass about 7.30 gram) using a steel die, at pressures of 24,490 psi. The pellets were than heated in an air furnace for an accumulated 232 hours at 1027° F. and subjected to three severe thermocycles (each one a total of about 20 minutes in duration) in which its temperature was lowered to 672° F. at a rate of about 122° F./min and raised back to 1022° F. in about 15 minutes.

Examination of the pellets after these thermocycles indicated effective support of the molten carbonate phase by the sub-micron sized $LiAlO_2$ particles with only minor weight loss, some minor crack formation but no pellet fracturing and good shape retention.

EXAMPLE II

Composite powder comprising 50 weight percent phase-change chemical sodium carbonate ($Na_2CO_3$) having a melting point of 1576° F. and 50 weight percent magnesium oxide (MgO) ceramic storage-support material was prepared by dry blending of the powders. Pellets measuring approximately 0.5 inch high and 0.80 inch in diameter and having magnesium oxide surface areas greater than 16 square meters per gram were again formed by cold-pressing in a steel die in the same manner as described in Example I. The pellets were successfully thermal cycled in an air oven through the sodium carbonate melting point (once from room temperature to 1652° F. and back) and examined. The pellets displayed good shape retention and integrity with no significant loss of salt.

EXAMPLE III

A solar energy thermal power system with an open-cycle Brayton engine may use heat from a high temperature thermal energy storage system of this invention to advantage since the predicted operating efficiency of fully regenerative open-cycle Brayton engines increases from 27 percent at an inlet temperature of 1850° F. to 48 percent at an inlet temperature of 2500° F. with the same outlet temperature. A high-temperature direct-contact thermal energy storage element may be used having 50 weight percent silicon metal solid-liquid phase-change chemical (melting point 2579° F. and latent heat of fusion 776 Btu/lb.) supported within the pores of a ceramic support matrix of MgO. Packed bed configuration having a void fraction of 0.4 may be used with a media temperature swing of 450° F. (2354° F.–2804° F.). Studies show such a direct contact thermal energy storage element as compared with $Al_2O_3$ and MgO bricks results in an average 75 percent reduction in media mass and an 82 percent decrease in system volume requirements per million Btu stored at 2354° to 2804° F. as well as substantially lowered fabricated media costs.

EXAMPLE IV

Powders comprising the indicated weight percentage of phase change metal and storage-support material were mixed and blended in a mortar and pestle to form a composite powder. The composite powder was pressed into pellets in a 1.12 inch diameter steel die at the indicated pressure. The pellets were then heat treated at the indicated temperature, time and atmosphere above the melting point of aluminum (1198° F). The conditions of forming the pellets are set forth in Table I:

TABLE I

| Composition wt % | Compacting Pressure psi | Green Density % Theoret. | Firing Conditions | Fired Density % Theoret. |
|---|---|---|---|---|
| 60 Al/40 $Al_2O_3$ | 10,000 | 59 | 2 hrs, 1292° F., $N_2$ | 2 |
| 60 Al/40 $Al_2O_3$ | 30,000 | 46 | 2 hrs, 1292° F., $N_2$ | 45 |
| 50 Al/50 $SiO_2$ | 10,000 | 70 | 2 hrs, 1382° F., $N_2$ | — |
| 46.7 Al/3.3 Cu/ | 30,000 | 72 | 5 hrs, | 2 |

TABLE I-continued

| Composition wt % | Compacting Pressure psi | Green Density % Theoret. | Firing Conditions | Fired Density % Theoret. |
|---|---|---|---|---|
| 50 SiO$_2$ | | | 1292° F., Ar | |

Examination of the pellets after heat treatment showed negligible changes in size or shape and no visual uneven distribution of the metal. In each case the pellet surface lost its luster and turned dark with the heat treatment.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A high-temperature direct-contact thermal energy storage and retrieval system for storage of thermal energy at about 400° to about 3000° F. comprising:
   a plurality of high-temperature direct-contact thermal storage elements comprising about 10 to about 90 volume percent solid-liquid phase-change chemical having a phase-change temperature at about 400° to about 3000° F. and selected from the group consisting of alkali metal and alkaline earth carbonates, chlorides, nitrates, nitrites, fluorides, hydroxides and sulfates, metals, metallic alloys and mixtures thereof supported within the pores of sensible thermal energy storage-support materials selected from the group consisting of metallic carbides, nitrides, silicides, oxides, aluminates, titanates and zirconates having submicron particle size which do not substantially coarsen with thermal cycling at temperatures up to said phase change temperature and having a surface area greater than about 1 square meter per gram of storage-support material, said storage-support material comprising about 10 to about 90 volume percent of said thermal storage element;
   at least one containment vessel(s) for said thermal storage elements;
   a storage working fluid for thermal energy transfer from a thermal energy heat source to said storage elements by direct contact with said storage elements at a temperature higher than said phase-change temperature and means for passage of said storage working fluid from said heat source to contact with storage elements in a storage mode; and
   a retrieval working fluid for thermal energy transfer from said storage element by direct contact with said storage elements at a temperature lower than said phase-change temperature to a desired use and means for passage of said retrieval working fluid from contact with said storage elements to said desired use in a retrieval mode.

2. The high-temperature direct-contact thermal energy storage and retrieval system of claim 1 wherein said solid-liquid phase-change chemical comprises about 50 to 80 volume percent and said storage-support material comprises about 20–50 volume percent.

3. The high-temperature direct-contact thermal energy storage and retrieval system of claim 2 wherein said storage-support material comprises porous ceramic storage-support material having particle size about 0.01 to about 1.0 microns and a pore surface area about 5 to about 100 square meters per gram of ceramic material.

4. The high-temperature direct-contact thermal energy storage system of claim 2 wherein said phase-change chemical is selected from the group consisting of sodium carbonate, potassium carbonate, lithium carbonate, magnesium carbonate, calcium carbonate, strontium carbonate, barium carbonate and mixtures thereof and said phase change temperature is about 700° to about 1700° F.

5. The high-temperature direct-contact thermal energy storage system of claim 2 wherein said phase-change chemical is selected from the group consisting of metals and metallic alloys, said phase-change temperature is about 1500° to about 3000° F.

6. The high-temperature direct-contact thermal energy storage system of claim 2 wherein said storage-support material is selected from the group consisting of lithium aluminate, sodium aluminate, magnesium oxide, alumina, lithium ferrite, lithium titanate, barium titanate, strontium titanate, and mixtures thereof and said phase-change chemical is selected from the group consisting of metals and metallic alloys.

7. The high-temperature direct-contact thermal energy storage system of claim 2 wherein said storage-support material is selected from the group consisting of lithium aluminate, sodium aluminate, magnesium oxide, alumina, lithium ferrite, lithium titanate, barium titanate, strontium titanate, and mixtures thereof and said phase-change chemical is selected from the group consisting of sodium carbonate, potassium carbonate, lithium carbonate, magnesium carbonate, calcium carbonate, strontium carbonate, and barium carbonate and mixtures thereof.

8. The high-temperature direct-contact thermal energy storage system of claim 1 wherein said sensible thermal storage-support material additionally comprises reinforcement selected from the group consisting of ceramic and metallic particulates and fibers and mixtures thereof.

9. The high-temperature direct-contact thermal energy storage system of claim 8 wherein said reinforcement comprises about 5 to about 20 volume percent, based upon the volume of said storage-support material of reinforcement selected from the group consisting of aluminum, stainless steel, Fi-Ni-Cr-Al alloys, and copper-aluminum alloys.

10. The high-temperature direct-contact thermal energy storage system of claim 1 wherein said sensible thermal storage-support material additionally comprises a thermal conductivity enhancing agent selected from metallic particulates and fibers and mixtures thereof.

11. The high-temperature direct-contact thermal energy storage system of claim 1 of discrete shapes having their maximum overall dimension of about 0.5 inch to about 12 inches.

12. The high-temperature direct-contact thermal energy storage system of claim 1 wherein said working fluids are selected from the group consisting of carbon dioxide, oxygen, air, inert gases, hydrogen, combustion gases, oils, molten metals, molten alloys and molten alkali metal and alkaline earth salts.

13. A process for high-temperature direct-contact thermal energy storage and retrieval comprising:
   passing a storage working fluid stream in contact with a plurality of thermal energy storage elements for storage of thermal energy at about 400° to about 3000° F. comprising about 10 to about 90 volume percent solid-liquid phase-change chemical having a phase-change temperature at about 400° to about 3000° F. and selected from the group consisting of alkali metal and alkaline earth carbonates, chlorides, nitrates, nitrites, fluorides, hydroxides and sulfates, metals, metallic alloys and mixtures thereof supported within the pores of sensible thermal energy storage-support material selected from the group consisting of refractory metals, carbides, nitrides, silicides, oxides, aluminates, titanates and zirconates having submicron particle size which do not substantially coarsen with thermal cycling at temperatures up to said phase-change temperature and having a surface area greater than about 1 square meter per gram of storage-support material, said ceramic storage-support material comprising about 10 to about 90 volume percent of said thermal storage element, the inlet temperature of said storage working fluid being above the phase-change temperature of said phase-change chemical; and when thermal retrieval is desired, passing a retrieval working fluid stream in contact with said plurality of thermal energy storage elements for retrieval of thermal energy, the inlet temperature of said retrieval working fluid stream being below the phase-change temperature of said phase-change chemical thereby increasing the temperature of said retrieval working fluid stream.

14. A high-temperature direct-contact thermal energy storage element for storage of thermal energy at about 400° to about 3000° F. comprising:

a containment vessel housing about 10 to about 90 volume percent solid-liquid phase-change chemical having a phase change temperature at about 400° to about 3000° F. and selected from the group consisting of alkali metal and alkaline earth carbonates, chlorides, nitrates, nitrites, fluorides, hydroxides, sulfates, metals, metallic alloys and mixtures thereof supported within the pores of sensible thermal energy storage-support material selected from the group consisting of metallic carbides, nitrides, silicides, oxides, aluminates, titanates and zirconates through which heat storage and heat retrieval fluid may be circulated, the particles of which do not substantially coarsen with thermal cycling at temperatures up to about said phase-change temperature and having a surface area greater than about 1 square meter per gram of storage-support material, said storage-support material comprising about 10 to about 90 volume percent of said thermal storage element.

15. The high-temperature direct-contact thermal energy storage element of claim 14 wherein said solid-liquid phase-change chemical comprises about 50 to about 80 volume percent and said storage-support material comprises about 20–50 volume percent.

16. The high-temperature direct-contact thermal energy storage element of claim 15 wherein said storage-support material comprises porous ceramic storage-support material having particle size about 0.01 to about 1.0 microns and a pore surface area about 5 to about 100 square meters per gram of ceramic material.

17. The high-temperature direct-contact thermal energy storage element of claim 15 wherein said phase-change chemical is selected from the group consisting of metals and metal alloys.

18. The high-temperature direct-contact thermal energy storage element of claim 17 wherein said phase-change temperature is about 1500° to about 3000° F.

19. The high-temperature direct-contact thermal energy storage element of claim 18 wherein said storage-support material is selected from the group consisting of lithium aluminate, sodium aluminate, magnesium oxide, alumina, lithium ferrite, lithium titanate, barium titanate, strontium titanate, and mixtures thereof.

20. The high-temperature direct-contact thermal energy storage element of claim 15 wherein said storage-support material is selected from the group consisting of lithium aluminate, sodium aluminate, magnesium oxide, alumina, lithium ferrite, lithium titanate, barium titanate, strontium titanate, and mixtures thereof and said phase-change chemical is selected from the group consisting of elemental Al, Cu, Si, Mg, Zn, Ti, Ce and La, and alloys thereof.

21. The high-temperature direct-contact thermal energy storage element of claim 15 wherein said phase-change chemical is selected from the group consisting of alkali metal and alkaline earth carbonates, chlorides, nitrates, nitrites, fluorides, hydroxides, sulfates and mixtures thereof and said storage-support material is selected from the group consisting of metallic carbides, nitrides and silicides.

22. The high-temperature direct-contact thermal energy storage element of claim 14 wherein said sensible thermal storage-support material additionally comprises reinforcement selected from the group consisting of ceramic and metallic particulates and fibers and mixtures thereof.

23. The high-temperature direct-contact thermal energy storage element of claim 22 wherein said reinforcement comprises about 5 to about 20 volume percent, based upon the volume of said storage-support material, of reinforcement selected from the group consisting of aluminum, stainless steel, Fi-Ni-Cr-Al alloys, and copper-aluminum alloys.

24. The high-temperature direct-contact thermal energy storage element of claim 14 wherein said sensible thermal storage-support material additionally comprises a thermal conductivity enhancing agent selected from metallic particulates and fibers and mixtures thereof.

25. The high-temperature direct-contact thermal energy storage element of claim 14 of discrete shapes having their maximum overall dimension of about 0.5 inch to about 12 inches.

* * * * *